(12) United States Patent
Satira et al.

(10) Patent No.: US 11,142,304 B2
(45) Date of Patent: Oct. 12, 2021

(54) RETRACTABLE LANDING GEAR SYSTEM FOR A VERTICAL TAKEOFF AND LANDING (VTOL) AIRCRAFT

(71) Applicant: SIKORSKY AIRCRAFT CORPORATION, Stratford, CT (US)

(72) Inventors: Jason A. Satira, Derby, CT (US); Charles Gayagoy, Milford, CT (US); Mark R. Alber, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 375 days.

(21) Appl. No.: 15/825,958

(22) Filed: Nov. 29, 2017

(65) Prior Publication Data
US 2019/0161175 A1    May 30, 2019

(51) Int. Cl.
| | | |
|---|---|---|
| *B64C 25/20* | (2006.01) | |
| *B64C 25/12* | (2006.01) | |
| *B64C 25/26* | (2006.01) | |
| *B64C 25/32* | (2006.01) | |

(52) U.S. Cl.
CPC ............ *B64C 25/20* (2013.01); *B64C 25/12* (2013.01); *B64C 25/26* (2013.01); *B64C 2025/325* (2013.01)

(58) Field of Classification Search
CPC ......... B64C 25/12; B64C 25/40; B64C 25/00; B64C 25/02; B64C 25/04; B64C 25/08; B64C 25/10; B64C 25/14; B64C 25/18; B64C 25/34; B64C 2025/006; B64C 2025/125; B64C 2025/325
See application file for complete search history.

(56) References Cited

U.S. PATENT DOCUMENTS 2,323,640 A * 7/1943 Armstrong .............. B64C 25/10
244/102 R
3,086,733 A * 4/1963 Hartel ..................... B64C 25/14
244/102 R (Continued)

FOREIGN PATENT DOCUMENTS

| GB | 538298 A | 7/1941 |
| GB | 2495999 A | 5/2013 |

OTHER PUBLICATIONS

Extended European Search Report for European Application No. 18208796.5; dated Apr. 29, 2019 (pp. 1-8).

*Primary Examiner* — Christopher D Hutchens
(74) *Attorney, Agent, or Firm* — Michael Best & Friedrich LLP

(57) ABSTRACT

A retractable landing gear system for a vertical takeoff and landing (VTOL) aircraft includes a rotational strut rotatably coupled to a fuselage of the VTOL aircraft. The rotational strut includes a first end, a second end, and an intermediate portion extending therebetween. A drag strut includes a first end portion pivotally connected to the rotational strut and a second end portion. A locking link includes a first end section pivotally connected relative to the fuselage, a second end section pivotally connected to the drag strut and an intermediate section having a hinge element. A retraction system is operatively connected to the rotational strut and the locking link. The retraction system is operable to pivot the drag strut about a first axis and rotate the rotational strut about a second axis that is distinct from the first axis.

19 Claims, 4 Drawing Sheets

(56) References Cited

U.S. PATENT DOCUMENTS

| | | | |
|---|---|---|---|
| 4,328,939 A * | 5/1982 | Davies | B64C 25/12 |
| | | | 244/102 R |
| 5,337,976 A | 8/1994 | Derrien | |
| 5,478,030 A * | 12/1995 | Derrien | B64C 25/12 |
| | | | 244/102 R |
| 6,360,990 B1 | 3/2002 | Grossman | |
| 6,824,100 B1 * | 11/2004 | Cheetham | B64C 25/20 |
| | | | 244/102 R |
| 7,575,193 B2 | 8/2009 | Payen et al. | |
| 8,490,919 B2 | 7/2013 | Nannoni et al. | |
| 2009/0108131 A1 * | 4/2009 | Lavigne | B64C 25/12 |
| | | | 244/102 A |
| 2012/0193470 A1 * | 8/2012 | Kosheleff | B64C 1/0009 |
| | | | 244/102 R |
| 2013/0020436 A1 * | 1/2013 | Ducos | B64C 25/12 |
| | | | 244/102 A |
| 2013/0299633 A1 | 11/2013 | Tierney et al. | |
| 2015/0069178 A1 * | 3/2015 | Brown | B64C 25/12 |
| | | | 244/102 R |
| 2015/0298798 A1 * | 10/2015 | Holloway | B64C 25/14 |
| | | | 244/102 R |
| 2019/0077499 A1 * | 3/2019 | Allwein | B64C 25/12 |
| 2019/0127052 A1 * | 5/2019 | Chen | B64C 37/00 |

* cited by examiner

RETRACTABLE LANDING GEAR SYSTEM FOR A VERTICAL TAKEOFF AND LANDING (VTOL) AIRCRAFT

BACKGROUND

Exemplary embodiments pertain to the art of vertical takeoff and landing (VTOL) aircraft and, more particularly, to a retractable landing gear for a VTOL aircraft.

Vertical takeoff and landing (VTOL) aircraft may include fixed landing members, such as skids, not retractable wheels and the like, or retractable landing members such as stowable wheels. Fixed landing surfaces are exposed to an airstream during flight and thus serve as a large source of drag on the aircraft. The drag reduces flight characteristics such as handling and flight range. Therefore, it is desirable to utilize retractable landing gear.

Retractable wheels are moved into a fuselage portion of the aircraft. In such cases the fuselage, in addition to accommodating passengers, equipment and aircraft systems, also provides spaces into which wheels may be retracted. The spaces not only must accommodate the wheels, but also support struts, motors and the like. Current crashworthy criteria which is being driven to accommodate higher sink rates leads to the use of more robust struts and other landing components which adds weight to, and often times reduces occupiable space in, the aircraft. That is, the desire to provide greater protection for aircraft components and occupants at higher sink rates drives the use of larger components and additional energy attenuating devices. The larger components and energy attenuating devices detract from cabin spaces that might be better put to other uses.

BRIEF DESCRIPTION

Disclosed is a retractable landing gear system for a vertical takeoff and landing (VTOL) aircraft including a rotational strut rotatably coupled to a fuselage of the VTOL aircraft. The rotational strut includes a first end, a second end, and an intermediate portion extending therebetween. A drag strut includes a first end portion pivotally connected to the rotational strut and a second end portion. A locking link includes a first end section pivotally connected relative to the fuselage, a second end section pivotally connected to the drag strut and an intermediate section having a hinge element. A retraction system is operatively connected to the rotational strut and the locking link. The retraction system is operable to pivot the drag strut about a first axis and rotate the rotational strut about a second axis that is distinct from the first axis.

In addition to one or more of the features described above or below, or as an alternative, further embodiments could include an energy attenuating strut mechanically connected to the second end of the rotational strut.

In addition to one or more of the features described above or below, or as an alternative, further embodiments could include wherein the first end portion of the drag strut is pivotally connected to the first end of the rotational strut.

In addition to one or more of the features described above or below, or as an alternative, further embodiments could include wherein the first end of the locking link is pivotally connected to the second end of the rotational strut.

In addition to one or more of the features described above or below, or as an alternative, further embodiments could include wherein the retraction system includes a first retraction member coupled to the rotational strut and a second retraction member coupled to the locking link.

In addition to one or more of the features described above or below, or as an alternative, further embodiments could include wherein the first end of the rotation strut includes a control horn operatively connected to the first retraction member.

In addition to one or more of the features described above or below, or as an alternative, further embodiments could include wherein the first retraction member comprises a first piston assembly having a first piston portion connected to the fuselage and a second piston portion coupled to the first piston portion and the control horn.

In addition to one or more of the features described above or below, or as an alternative, further embodiments could include wherein the second retraction member comprises a second piston assembly having a first piston end connected to the rotational strut and a second piston end connected to the locking link at the hinge element.

In addition to one or more of the features described above or below, or as an alternative, further embodiments could include wherein the first piston end is connected to the fuselage through the rotational strut.

Also disclosed is a vertical takeoff and landing (VTOL) aircraft including a fuselage, a main rotor supported by the fuselage, and a retractable landing gear system including a rotational strut rotatably coupled to the fuselage. The rotational strut includes a first end, a second end, and an intermediate portion extending therebetween. A drag strut includes a first end portion pivotally connected to the rotational strut and a second end portion. A locking link includes a first end section pivotally connected relative to the fuselage, a second end section pivotally connected to the drag strut and an intermediate section having a hinge element. A retraction system is operatively connected to the rotational strut and the locking link. The retraction system is operable to pivot the drag strut about a first axis and rotate the rotational strut about a second axis that is distinct from the first axis.

In addition to one or more of the features described above or below, or as an alternative, further embodiments could include an energy attenuating strut mechanically connected to the second end of the rotational strut.

In addition to one or more of the features described above or below, or as an alternative, further embodiments could include wherein the first end portion of the drag strut is pivotally connected to the first end of the rotational strut.

In addition to one or more of the features described above or below, or as an alternative, further embodiments could include wherein the retraction system includes a first retraction member coupled to the rotational strut and a second retraction member coupled to the locking link.

In addition to one or more of the features described above or below, or as an alternative, further embodiments could include wherein the first end of the rotation strut includes a control horn operatively connected to the first retraction member.

In addition to one or more of the features described above or below, or as an alternative, further embodiments could include wherein the first retraction member comprises a first piston assembly having a first piston portion connected to the fuselage and a second piston portion coupled to the first piston portion and the control horn.

In addition to one or more of the features described above or below, or as an alternative, further embodiments could include wherein the second retraction member comprises a second piston assembly having a first piston end connected to the rotational strut and a second piston end connected to the locking link at the hinge element.

Further disclosed is a method of retracting a landing gear of a vertical takeoff and landing (VTOL) aircraft including folding a drag strut about a first axis, and rotating a rotational strut mounted to a fuselage of the VTOL aircraft about a second axis.

In addition to one or more of the features described above or below, or as an alternative, further embodiments could include wherein rotating the rotational strut about the second axis include rotating the rotational strut about an axis that is substantially perpendicular to the first axis.

In addition to one or more of the features described above or below, or as an alternative, further embodiments could include wherein rotating the rotational strut about the second axis include rotating the rotational strut about an axis that is off-set from a longitudinal axis of the rotational strut.

In addition to one or more of the features described above or below, or as an alternative, further embodiments could include wherein folding the drag strut includes collapsing a locking link connecting the drag strut to the rotational strut.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
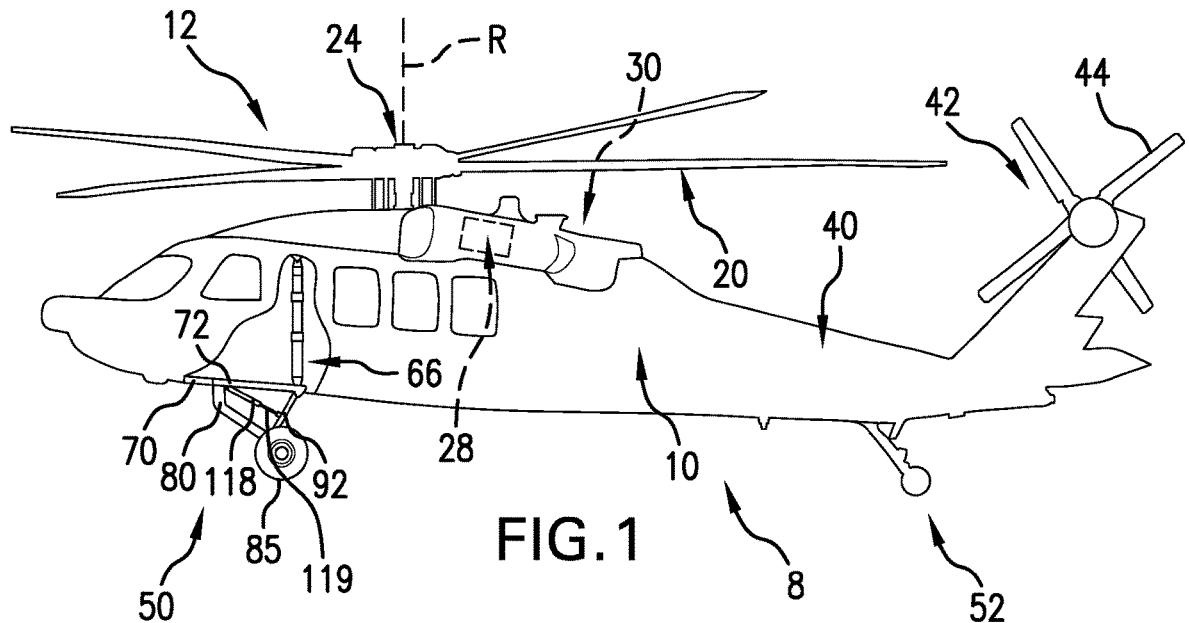
FIG. 1 depicts a rotary wing aircraft including a retractable landing gear system in a deployed configuration, in accordance with an exemplary embodiment.
Figure 2:
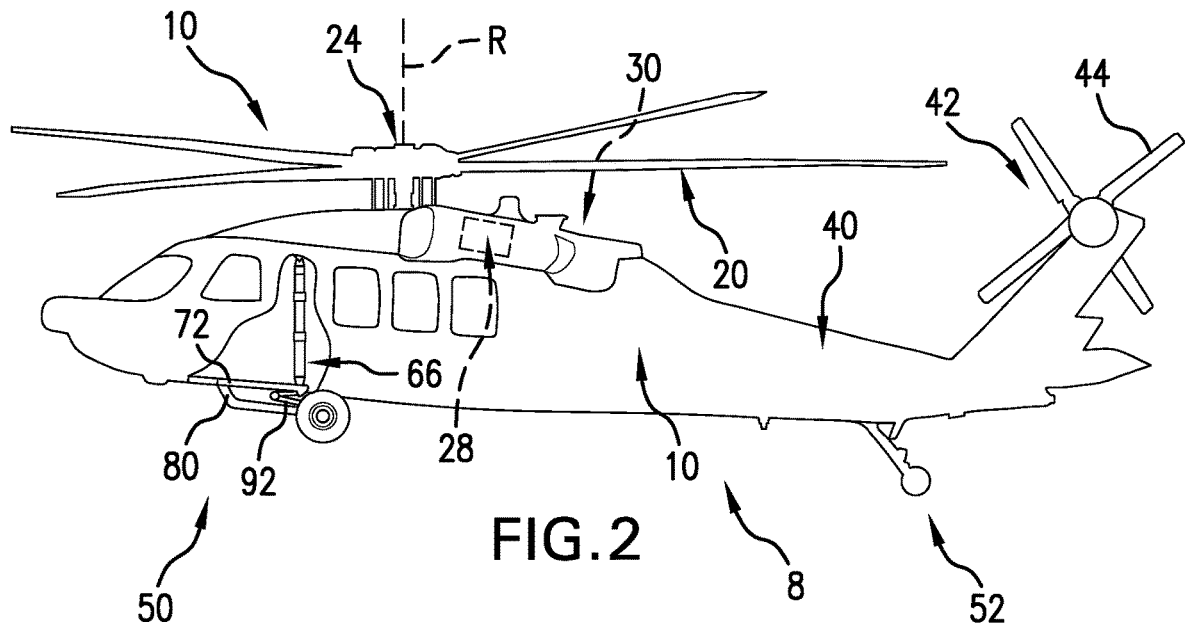
FIG. 2 depicts the rotary wing aircraft of FIG. 1 showing the retractable landing gear system in an intermediate retraction configuration, in accordance with an exemplary embodiment.
Figure 3:
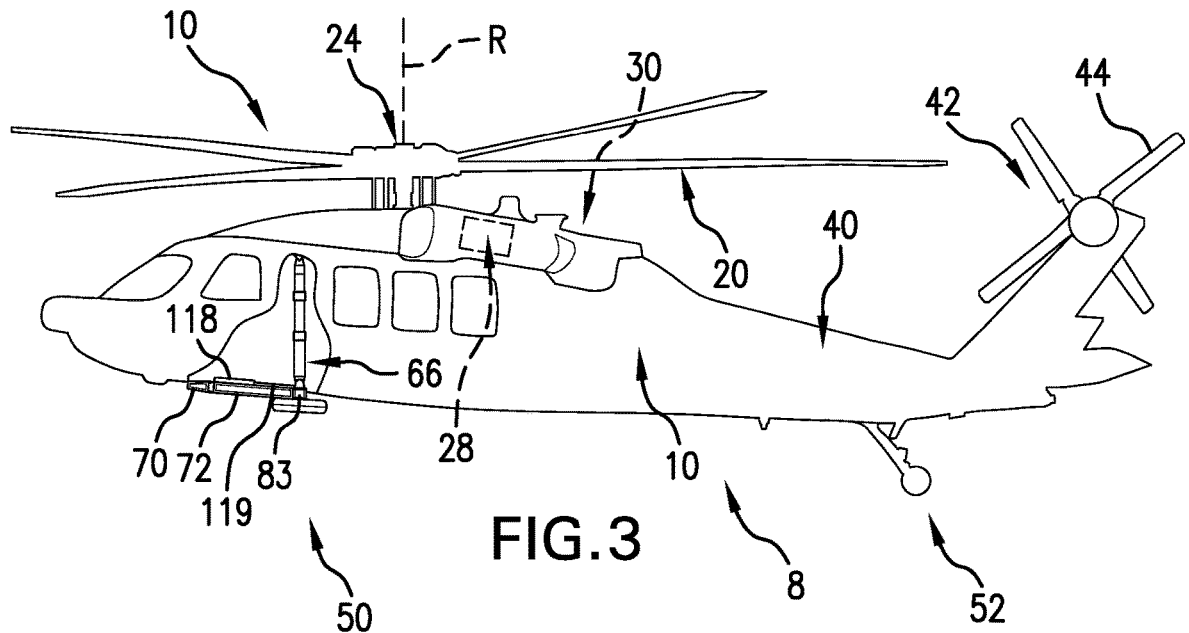
FIG. 3 depicts the rotary wing aircraft of FIG. 2 showing the retractable landing gear system in a fully retracted configuration, in accordance with an exemplary embodiment.

FIGS. 1-3 depict a vertical takeoff and landing (VTOL) aircraft 8 including a fuselage 10 that supports a main rotor system 12, which rotates about a main rotor axis R. Main rotor system 12 includes a plurality of rotor blades 20 rotatable about a main rotor axis "R". Plurality of rotor blades 20 is mounted to a rotor hub 24. Main rotor system 12 is driven by a gearbox 28 coupled to one or more prime movers, indicated generally at 30. Aircraft 8 includes an extending tail 40 that supports a tail rotor system 42 including a plurality of tail rotor blades, indicted generally at 44. Tail rotor system 42 may be operatively coupled to gearbox 28 through a drive shaft (not shown).

In accordance with an exemplary aspect, aircraft 8 includes a retractable landing gear system 50 and a tail wheel 52 mounted to fuselage 10. Retractable landing gear system 50 retracts and rotates. The retraction and rotation reduces drag on aircraft 8 without detracting from a capacity of, for example, a passenger compartment or cargo area (not separately labeled). Specifically, retractable landing gear system 50 may translate between a fully deployed configuration (FIG. 1), an intermediate retraction configuration (FIG. 2) and a fully retracted configuration (FIG. 3).

Figure 4:
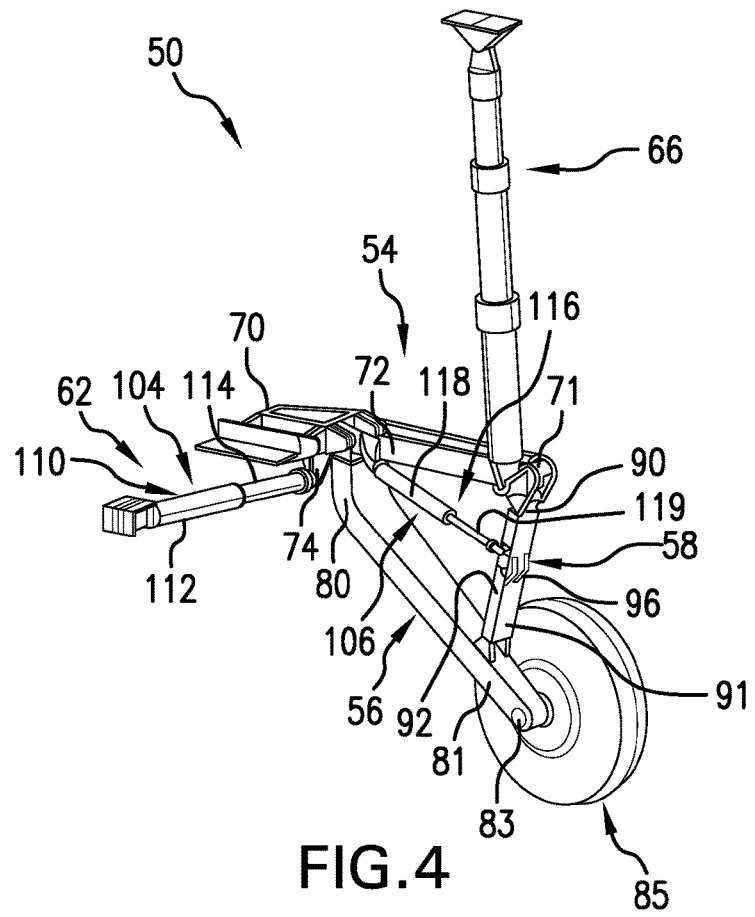
FIG. 4 depicts the retractable landing gear system in a deployed configuration, in accordance with an exemplary embodiment.
Figure 5:
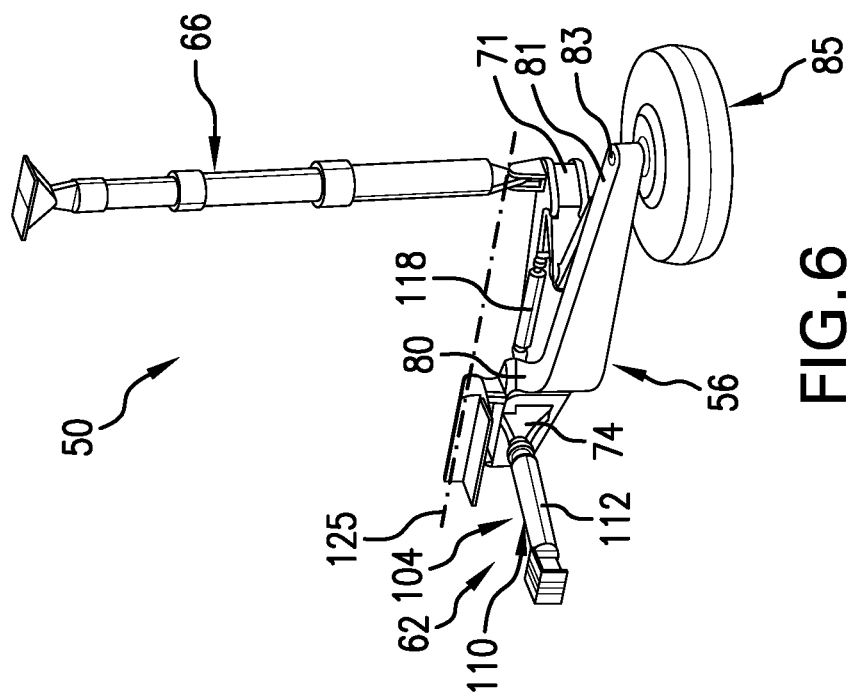
FIG. 5 depicts the retractable landing gear system of FIG. 4 in an intermediate retraction configuration, in accordance with an exemplary embodiment.
Figure 6:
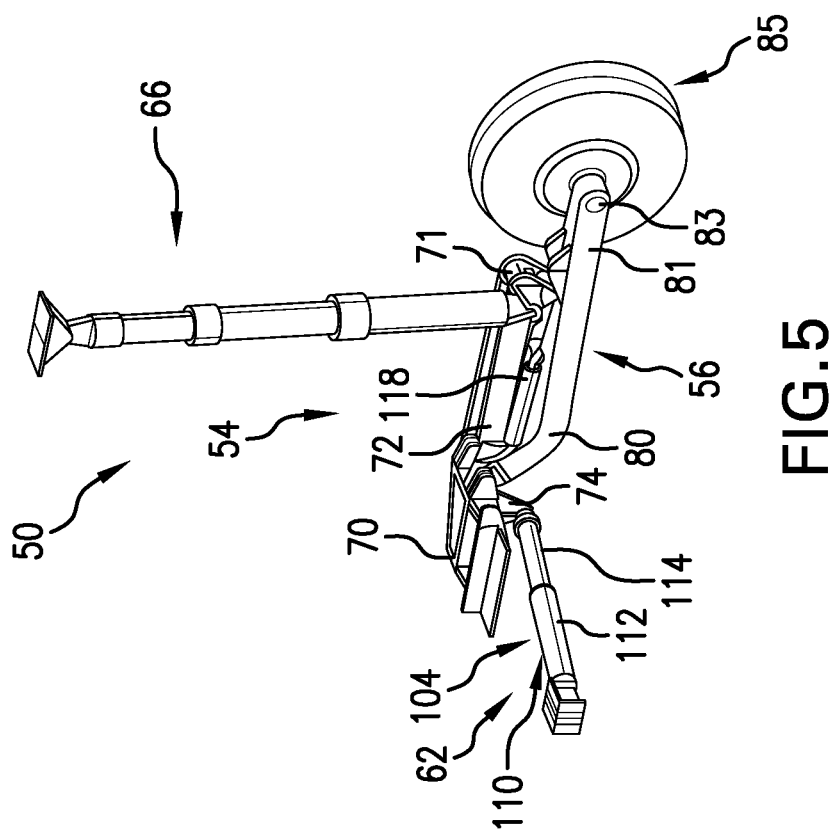
FIG. 6 depicts a retractable landing gear system in a fully retracted configuration, in accordance with an exemplary embodiment.

Referencing FIGS. 4-6, retractable landing gear system 50 includes a rotational strut 54, a drag strut 56, a locking link 58 and a retraction system 62. Retractable landing gear system 50 may also include an energy attenuation strut 66 which is designed to absorb loads that might be induced to aircraft 8 with a hard landing as will be discussed herein. Rotational strut 54 is coupled to fuselage 10 and includes a first end 70, a second end 71 and an intermediate portion 72 extending therebetween. First end 70 includes a control horn 74 which, as will be discussed herein, is mechanically connected to retraction system 62.

In further accordance with an exemplary aspect, drag strut 56 includes a first end portion 80 mechanically connected to rotational strut 54, and a second, opposing end portion 81. Second opposing end portion 81 supports an axle 83 which, in turn, rotatably supports a wheel assembly 85. Locking link 58 includes a first end section 90, a second end section 91, and an intermediate section 92 extending therebetween. Intermediate section 92 supports a hinge element 96 that allows locking link 58 to fold.

Retraction system 62, in accordance with an exemplary aspect, includes a first retraction member 104 connected to rotational strut 54 and a second retraction member 106 connected to locking link 58. More specifically, first retraction member 104 includes a first piston assembly 110, including a first piston portion 112 connected to fuselage 10 and a second piston portion 114 connected to control horn 74. Second retraction member 106 includes a second piston assembly 116 including a first piston end 118 connected to rotational strut 54 and a second piston end 119 connected to locking link 58 near hinge element 96. First and second retraction members 104 and 106 are selectively activated to transition retractable landing gear between a fully deployed configuration and a retracted configuration. Further, while described as piston members, it should be understood that first and second retraction members 104 and 106 may take on a variety of forms including fluid driven, gear driven, or other forms of linear actuators.

In accordance with an exemplary aspect, second retraction member 106 is selectively activated to fold locking link 58, causing drag strut 56 to move toward fuselage 10 as shown in FIG. 5. First retraction member 104 may then be activated to rotate rotational strut 54 about an axis 125. Axis 125 is laterally offset relative to an axis that extends through rotational strut 54 along intermediate portion 72 as shown in FIG. 6. It should be appreciated that the particular order of retraction steps may vary. That is, first retraction member 104 may be activated before second retraction member 106.

Figure 7:
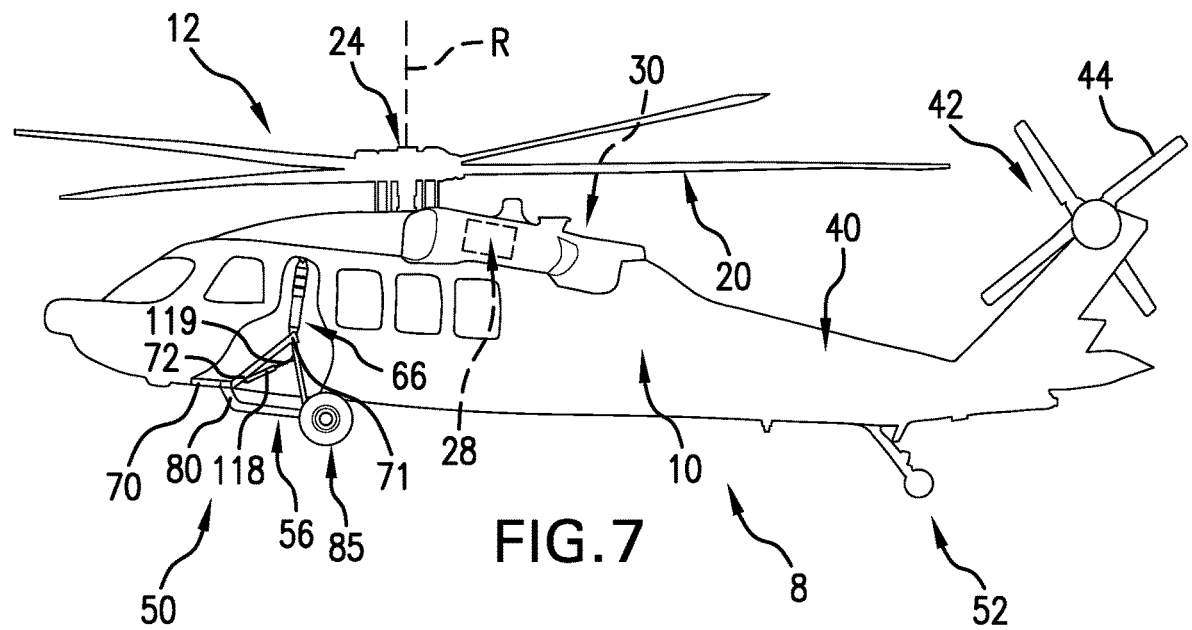
FIG. 7 depicts the retractable landing gear system of FIG. 4 in an energy attenuation configuration, in accordance with an aspect of an exemplary embodiment.

Energy attenuation strut 66 will respond to changes in aircraft loading during landings, taxiing and the like. Further, in the event that aircraft 8 experiences a hard landing, e.g. a landing that is in excess of a selected acceleration, energy attenuation strut 66 may collapse as shown in FIG. 7. The selected acceleration may depend upon aircraft various constraints, such as loading, age, design and/or other factors. The collapsing of energy attenuation strut 66 absorbs all or a portion of the energy associated with the hard landing so as to protect aircraft occupants and systems. At this point, it should be appreciated that the retractable landing gear described herein reduces drag on aircraft 8 without detracting from a capacity of, for example, a passenger compartment or cargo area (not separately labeled). Specifically, the rotation and retraction of the landing gear components removes wheel assembly 85 from an airstream generated during flight without the need for space in occupant or cargo compartments of the aircraft. It should be understood, that the retractable landing gear may move into and out from a fairing (not shown) that further reduces drag.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A retractable landing gear system for a vertical takeoff and landing (VTOL) aircraft comprising:
    a rotational strut rotatably coupled to a fuselage of the VTOL aircraft, the rotational strut including a first end, a second end, and an intermediate portion extending therebetween;
    a drag strut including a first end portion pivotally connected directly to the rotational strut, a second end portion, and an axle extending through the second end portion, the axle supporting a wheel assembly;
    a locking link including a first end section pivotally connected relative to the fuselage, a second end section pivotally connected to the drag strut and an intermediate section having a hinge element that facilitates folding of the first end section relative to the second end section; and
    a retraction system operatively connected to the rotational strut and the locking link, the retraction system being operable to pivot the drag strut about a first axis and rotate the rotational strut about a second axis that is distinct from the first axis.

2. The retractable landing gear system for the VTOL aircraft according to claim 1, further comprising: an energy attenuating strut mechanically connected to the second end of the rotational strut.

3. The retractable landing gear system for the VTOL aircraft according to claim 1, wherein the first end portion of the drag strut is pivotally connected directly to the first end of the rotational strut.

4. The retractable landing gear system for the VTOL aircraft according to claim 1, wherein the first end of the locking link is pivotally connected to the second end of the rotational strut.

5. The retractable landing gear system for the VTOL aircraft according to claim 1, wherein the retraction system includes a first retractor member coupled to the rotational strut and a second retractor member coupled to the locking link.

6. The retractable landing gear system for the VTOL aircraft according to claim 5, wherein the first end of the rotational strut includes a control horn operatively connected to the first retractor member.

7. The retractable landing gear system for the VTOL aircraft according to claim 6, the first retractor member comprises a first piston assembly having a first piston portion connected to the fuselage and a second piston portion coupled to the first piston portion and the control horn.

8. The retractable landing gear system for the VTOL aircraft according to claim 7, wherein the second retractor member comprises a second piston assembly having a first piston end connected to the rotational strut and a second piston end connected to the locking link at the hinge element.

9. The retractable landing gear system for the VTOL aircraft according to claim 8, wherein the first piston end is connected to the fuselage through the rotational strut.

10. A vertical takeoff and landing (VTOL) aircraft comprising:
    a fuselage;
    a main rotor supported by the fuselage; and
    a retractable landing gear system comprising:
        a rotational strut rotatably coupled to the fuselage, the rotational strut including a first end, a second end, and an intermediate portion extending therebetween;
        a drag strut including a first end portion pivotally connected directly to the rotational strut, a second end portion, and an axle extending through the second end portion, the axle supporting a wheel assembly;
        a locking link including a first end section pivotally connected relative to the fuselage, a second end section pivotally connected to the drag strut and an intermediate section having a hinge element that facilitates folding of the first end section relative to the second end section; and
        a retraction system operatively connected to the rotational strut and the locking link, the retraction system being operable to pivot the drag strut about a first axis and rotate the rotational strut about a second axis that is distinct from the first axis.

11. The retractable landing gear system for the VTOL aircraft according to claim 10 further comprising: an energy attenuating strut mechanically connected to the second end of the rotational strut.

12. The retractable landing gear system for the VTOL aircraft according to claim 10, wherein the first end portion of the drag strut is pivotally connected directly to the first end of the rotational strut.

13. The retractable landing gear system for the VTOL aircraft according to claim 10, wherein the retraction system includes a first retractor member coupled to the rotational strut and a second retractor member coupled to the locking link.

14. The retractable landing gear system for the VTOL aircraft according to claim 13, wherein the first end of the rotational strut includes a control horn operatively connected to the first retractor member.

15. The retractable landing gear system for the VTOL aircraft according to claim 14, the first retractor member comprises a first piston assembly having a first piston portion connected to the fuselage and a second piston portion coupled to the first piston portion and the control horn.

16. The retractable landing gear system for the VTOL aircraft according to claim 15, wherein the second retractor member comprises a second piston assembly having a first piston end connected to the rotational strut and a second piston end connected to the locking link at the hinge element.

17. A method of retracting a landing gear of a vertical takeoff and landing (VTOL) aircraft comprising:

folding a drag strut about a first axis wherein a first end of the drag strut is pivotally connected directly to a rotational strut about the first axis, the drag strut including a second end portion, an axle extending through the second end portion, and a wheel assembly connected to the axle; and rotating the rotational strut mounted to a fuselage of the VTOL aircraft about a second axis, wherein folding the drag strut includes hinging a first end of a locking link connecting the drag strut to the rotational strut relative to a second end of the locking link.

18. The method of claim 17, wherein rotating the rotational strut about the second axis includes rotating the rotational strut about an axis that is substantially perpendicular to the first axis.

19. The method of claim 17, wherein rotating the rotational strut about the second axis include rotating the rotational strut about an axis that is off-set from a longitudinal axis of the rotational strut.

* * * * *